United States Patent [19]

Charlier et al.

[11] Patent Number: 6,159,567

[45] Date of Patent: Dec. 12, 2000

[54] POLYPROPYLENE BLOCK COPOLYMERS AND CONTAINERS MADE THEREFROM

[75] Inventors: Jean Charlier, Ceroux-Mousty; Emmanuel Delaite, Braine-le-Comte; Raymond Mikielski, La Hulpe, all of Belgium

[73] Assignee: Solvay Polyolefins Europe-Belgium (Societe Anonyme), Brussels, Belgium

[21] Appl. No.: 09/024,123

[22] Filed: Feb. 17, 1998

[30] Foreign Application Priority Data

Feb. 25, 1997 [GB] United Kingdom ............ 97.03841

[51] Int. Cl.$^7$ .................... B65D 23/00; B29C 45/00; B29C 55/28; C08F 293/00

[52] U.S. Cl. ............... 428/36.9; 428/36.92; 428/521; 428/523; 428/542.8; 428/35.7; 525/323; 264/532; 264/537

[58] Field of Search ............... 525/323; 428/36.9, 428/36.91, 36.92, 35.7, 542.8, 521, 523; 215/12.1, 379; 264/532, 537, 523

[56] References Cited

U.S. PATENT DOCUMENTS

| | | | |
|---|---|---|---|
| 4,621,114 | 11/1986 | Watanabe | 524/451 |
| 5,204,305 | 4/1993 | Fiasse et al. | 502/124 |
| 5,230,934 | 7/1993 | Sakano et al. | 428/35.7 |
| 5,684,099 | 11/1997 | Watanabe et al. | 526/135 |

FOREIGN PATENT DOCUMENTS

| | | |
|---|---|---|
| 829370 | 12/1969 | Canada . |
| 0202946A2 | 11/1986 | European Pat. Off. . |
| 0261727 | 3/1988 | European Pat. Off. . |
| 0482855A2 | 4/1992 | European Pat. Off. . |
| 0534119A2 | 3/1993 | European Pat. Off. . |
| 0700933A2 | 3/1996 | European Pat. Off. . |
| 0700943A1 | 3/1996 | European Pat. Off. . |
| 59-41316 | 3/1984 | Japan . |
| 61271315 | 12/1986 | Japan . |
| 1311227 | 3/1973 | United Kingdom . |
| 2055388 | 3/1981 | United Kingdom . |
| 2161493 | 1/1986 | United Kingdom . |

OTHER PUBLICATIONS

Derwent Abstract of JP 59–41316 A; Propylene–Ethylene Block Copolymers; Mitsui–Toatsu Chem Inc., Mar. 1984.
West JPO Abstract of JP359041316A; Propylene–Ethylene Block Copolymer and Preparation Thereof; Asanuma et al., Mar. 1984.

*Primary Examiner*—Rena L. Dye
*Assistant Examiner*—John J. Figueroa
*Attorney, Agent, or Firm*—Venable; George H. Spencer; Marina V. Schneller

[57] ABSTRACT

A propylene block copolymer comprising (A) 60–90 weight %, based on the total amount of the block copolymer, of a first block of a propylene polymer, optionally containing a small amount of copolymerised ethylene, (B) 40–10 weight %, based on the total amount of the block copolymer, of a second block of an ethylene-propylene copolymer containing 1–10 weight % of ethylene, and the total ethylene content of the block copolymer being within the range of 0.1–2.5%. The weight process for the manufacturing of the propylene block copolymer and use of it for the manufacture of bioriented bottles.

9 Claims, No Drawings

POLYPROPYLENE BLOCK COPOLYMERS AND CONTAINERS MADE THEREFROM

The present invention relates to polypropylene block copolymers and containers made therefrom. More specifically, the invention relates to polypropylene block copolymers and bi-oriented bottles made thereof which have a good balance between rigidity, transparency and processability.

The present invention relates also to the use of said block copolymers in thermomoulding and blow-moulding techniques, in particular in the manufacture of bi-oriented bottles by injection stretch blow-moulding techniques and to bi-oriented bottles formed from said block copolymer.

The increasing demand on the market for high quality plastic bottles with a transparency like glass has lead to intensive development activities especially on the polypropylene (PP) sector as PP is one of the most inexpensive commodity plastics. Machinery manufacturers like BEKUM and NISSEI ASB have been particularly involved in designing equipment which overcomes the difficulties associated with the previous equipment (especially the poor control during manufacture) and allows now the production of high quality bi-oriented bottles from polypropylene (BOPP bottles) by means of an injection stretch blow-moulding process. The polypropylene resins used for this application are, on one hand, the homopolymers which are rigid but translucent, and, on the other hand, random copolymers with ethylene which have a large melting range and good optical properties but a lower stiffness. Thus, PP grades which show an excellent balance between mechanical and optical properties, processability and organoleptic properties are still demanded by the markets. Propylene block copolymer could be usable in such applications.

Propylene block copolymers as such are known from various documents. For example, CA-A-829370 discloses crystalline propylene block copolymers with an ethylene content of 0.5–20 weight % prepared with a sterospecific $TiCl_3$—coordinated catalyst. However, the weight ratio of the first to the second block is not indicated and it results from the examples that the ethylene content in the second block is fairly high.

Japanese patent application N° 61/271315 as summarized in Chemical Abstract 107, 40566y discloses injection-mouldable propylene block copolymers containing 5–95 weight parts of a polypropylene homopolymer as the first block, and 95–5 weight parts of a random ethylene-propylene copolymer with an ethylene content of the second block of 2–15 weight %.

According to the example of the abstract, the random ethylene-propylene copolymer content of the block copolymer is about 55 weight %.

GB-A-2 055 388 describes propylene block copolymers with an ethylene content greater than 1 weight %, preferably above 4 weight %, having improved impact strength and processability and being usable in the manufacture of bottles by blow moulding techniques. In the presence of a Ti-containing catalyst, propylene is polymerized in a first step and then, in a second step, a random ethylene/propylene copolymer is formed in an amount of 5–40 weight % based on the total weight of the block copolymer.

However, here again the ethylene content in the second block is fairly high and the properties of those polymers remain insufficient for the production of high quality bi-oriented bottles.

It has now been found that propylene block copolymers having both a low overall ethylene content and a low ethylene content in the second block are particularly suitable for the production of articles by moulding techniques, especially stretch blow-moulding techniques, whereby a fairly broad temperature range can be applied in the bi-orientation step, in particular during the fabrication of the bi-oriented bottles.

Accordingly, the present invention is directed to a propylene block copolymer comprising (A) 60–90 weight %, based on the total amount of the block copolymer, of a first block of a propylene polymer, optionally containing a small amount of copolymerised ethylene, (B) 40–10 weight %, based on the total amount of the block copolymer, of a second block of a ethylene-propylene random copolymer containing 1–10 weight % of ethylene, the total ethylene content of the block copolymer being within the range of 0.1–2.5 weight %.

Such block copolymers are especially suitable for the production of BOPP bottles by means of injection stretch blow-moulding techniques.

In the present invention, the ethylene content is determined by Fourrier transform IR spectrometry, by using the absorption bands at 733 $cm^-$ and 720 $cm^{-1}$.

According to the present invention, the first block of the propylene block copolymer optionally contains a small amount of copolymerized ethylene. The ethylene content in that block is such that the total ethylene content of the block copolymer does not exceed 2.5 weight %. When present, the ethylene content in the first block is preferably at least 0.3 weight %. Generally the ethylene content in the first block is lower that 2.5 weight % and particularly lower than 1weight %. Good results are obtained when the first block is a propylene homopolymer.

Preferably, the first block is a propylene polymer with an isotacticity of at least 95% as measured by $^{13}C$ NMR spectroscopy in mm triades, more preferably at least 97%. Block copolymers wherein the first block is a propylene homopolymer with an isotacticity of at least 95% as measured by $^{13}C$ NMR spectroscopy are highly suitable.

The amount of the first block, based on the total amount of the block copolymer, is preferably at least 75 weight %. Preferably, this amount does not exceed 85 weight %. The corresponding amount for the second block does preferably not exceed 25 weight %. Good results are obtained when this amount is at least 15 weight %.

Preferably the total ethylene content of the block copolymer is at least 0.5 weight, more preferably at least 1.0 weight %. Preferably, this ethylene content does not exceed 2.0 weight %.

The ethylene content of the second block is preferably at least 4 weight % and more preferably at least 5 weight %. Preferably it does not exceed 9 weight %, more preferably 8 weight %.

A particularly preferred block copolymer is a propylene block copolymer consisting of (A) 75–85 weight %, based on the total amount of the block copolymer, of a first block of a polypropylene homopolymer with an isotacticity of 97% as measured by $^{13}C$ NMR spectroscopy in mm triades, (B) 25–15 weight %, based on the total amount of the block copolymer, of a second block of an ethylene-propylene random copolymer containing 4–9 weight % of ethylene, the total ethylene content of the block copolymer being within the range of 0.5–2.0 weight %.

The block copolymers of present invention have preferably a melt flow rate (MFI), measured according to ASTM Standard D 1238 (1986) (230° C.; load 2.16 kg) of from 0.5 to 50 g/10 min and preferably of from 5 to 20 g/10 min.

The melting temperature of said block copolymers is preferably within the range of from 150 to 160° C.

The block copolymers according to the invention are prepared through sequential polymerization using highly stereospecific Ziegler-Natta catalyst, in continuous or discontinuous fashion.

Accordingly the present invention relates to a process for the manufacturing of the block copolymers according to the invention, the said process comprising a first step wherein propylene is polymerized optionally with a small amount of ethylene in order to form the first block (A) and a second step wherein propylene and ethylene are random copolymerized in order to form the second block (B) in the presence of block (A).

The general polymerization conditions are well known to the person skilled in the art.

Preferably, the polymerization steps are carried out in liquid monomers, and very particularly in liquid monomers at a polymerization temperature of from 40 to 60° C.

The Ziegler-Natta catalyst giving the best results comprises a catalytic solid based on titanium trichloride complexed with an electron-donating compound (called internal electron-donating compound), an organoaluminium compound and, optionally a further electron-donating compound (called external electron-donating compound).

The solid based on titanium trichloride may be prepared by any known process. It is generally preferred to use a solid obtained by a process involving an initial reduction of titanium compound in which the titanium is at the valence 4, such as titanium tetrachloride, with an organoaluminium reducing agent, such as an alkylaluminium chloride.

This reduced solid is then subjected to successive or simultaneous treatments by means of at least one electron-donating compound (internal electron-donating compound) and of a halogen compound.

The electron-donating compound is preferably selected from the aliphatic ethers comprising 4 to 6 carbon atoms such as diisoamylether.

Most often, the halogen compound is chosen from the inorganic halogen compounds such as titanium tetrahalide.

At any time during its preparation, the solid based on titanium trichloride may be subjected to a treatment consisting in bringing it into contact with a lower α-monoolefin such as ethylene or propylene, under polymerising conditions so as to obtain a solid generally containing from 5 to 500% by weight of prepolymerized α-monoolefin relative to the weight of titanium halide which it contains.

In addition, at any time during its preparation, but preferably after the treatment with the halogen compound, the solid based on titanium trichloride may be subjected to an additional treatment with the aim of maintaining the stability of its properties and/or of increasing its stereospecificity. This treatment consists in bringing the solid, preferably separated from the medium in which it has been prepared, into contact with an activating agent selected from organoaluminium compounds and compounds which are the products of reaction of an organoaluminium compound with a compound selected from hydroxyaromatic compounds in which the hydroxyl group is sterically hindered.

A preferred method of preparation of the solid based on titanium trichloride usable for preparing the block copolymers of the invention comprises the following successive steps:

the reduction of titanium tetrachloride by means of a dialkylaluminium chloride in which the alkyl chains comprise from 2 to 6 carbon atoms under mild conditions in order to obtain a reduced solid, the prepolymerization of the reduced solid by bringing it, under polymerization conditions, into contact with propylene or ethylene, the successive or simultaneous treatments with the aliphatic ether (internal electron-donating compound) and the halogen compound defined above, the separation of the solid so obtained from its preparation medium, and a treatment consisting in bringing the separated solid into contact with the product of the reaction of an organoaluminium compound with a compound selected from hydroxyaromatic compounds in which the hydroxyl group is sterically hindered.

Further details in relation with this method of preparation will be found in EP-A-0261727.

The organoaluminium compound is generally a compound of formula $$Al\ R_n X_{3-n}$$

wherein

R is an alkyl radical containing from 1 to 12 carbon atoms;

X is a halogen; the best results being obtained when X is chlorine;

n is any number such that $0 < n \leq 3$ and preferably such that $1.5 \leq n \leq 2.5$.

It is also possible to introduce an electron-donating compound into the catalyst (external electron-donating compound).

Such external electron-donating compound is preferably chosen from esters, amides and organosilanes. Aromatic carboxylic acid esters are generally preferred.

The various constituents of the catalyst are generally made use of so that the atomic ratio of the aluminium of the organoaluminium compound to the titanium of the catalytic solid is from 0.1 to 100, preferably from 1 to 20. In addition, the molar ratio of the aluminium of the organoaluminium compound to the external electron-donating compound is generally from 1 to 100.

As already said here above the block copolymers according to the invention can be easily processed by thermomoulding and more particularly they are very suitable in the manufacture of containers by blow-moulding techniques and particularly for the manufacture of bi-oriented bottles (BOPP bottles) by injection stretch blow moulding techniques.

The BOPP bottles can be produced by an injection stretch blow-moulding process, either by the single step or the two step injection stretch blow-moulding process. The latter is also called "two phase reheat and stretch blow-moulding process". Whatever the process, the starting point of the bi-orientation process is the manufacture of an injection moulded preform having a controlled thermal history which provides the propylene block copolymer especially designed for this application with a regular and fine crystalline structure. In the case of the single step process, it is more correct to talk about the initiation of a crystalline structure. This preform is perfectly homogeneously reheated (reheat process) or its temperature is well controlled (single step process) at a temperature just below its melting point. Next it is stretched considerably (about 5 to 10 times) generating high stresses which disintegrate the crystalline structure; the optical properties are quite enhanced through this orientation.

These processes are well known, and a person skilled in the art can easily choose the appropriate process conditions.

Special attention should be given to a strict stretching temperature control, and hence controlled heating kinetics and quality, and to high longitudinal and transversal stretching rates. However, the latter should not be too large, otherwise the long heating times of thick-walled preforms have a deleterious influence on the total manufacturing cycle. Another aspect to be considered is the design of the preform. Its well-adapted thickness ensures an even flow of the material which is essential to optimise the weight of the bottle.

Special nucleating agents may be added to the PP block copolymer. They lead to a higher transparency and gloss of the surface of the bottles and increase the impact strength. These agents which reduce the spherulite size lead, on one side, to a reduction of the size of the scattering centers and, on the other side, to an increase of the crystallinity which gives a higher stiffness. However, nucleating agents are not absolutely necessary.

The use of the propylene block copolymers of the present invention in the above mentioned processes offers a variety of advantages: the resulting containers and bottles have, for example, a favourable price/property ratio, good mechanical properties and a very high transparency. They are especially suitable for the detergents, cosmetics, pharmaceutical and food packaging industry.

The examples which follow serve to illustrate the invention.

EXAMPLE 1

A block copolymer comprising 80 weight % of a first block (A) which is a propylene homopolymer and 20 weight % of a second block (B) which is a random copolymer of propylene and ethylene is continuously prepared in two successive interconnected reactors of same volumes, the first one being used to manufacture block (A) which is transferred into the second one wherein block (B) is manufactured.

The polymerization in both reactors is performed in liquid propylene at about 50° C. under a propylene pressure of 30 bar, in the presence of the catalyst disclosed in example 2 of United States patent 5204305 (SOLVAY) which comprises a catalytic solid based on titanium trichloride complexed with diisoamylether (internal electron-donating compound), ethylaluminium chloride and ethyl benzoate (external electron-donating compound) in such amounts that the ethylaluminium chloride/ethyl benzoate molar ratio is 45 and the aluminium/titanium atomic ratio is 8 in the polymerization medium. The catalyst is continuously introduced in the polymerization medium of the first reactor as a hexane suspension in an amount able to lead to a polymer production of 2.5 kg per g of $TiCl_3$ present in the catalytic solid and per hour.

The production's ratio of the two reactors is adjusted by means of the ratio of the residence times of each block in the respective reactors.

The melt flow index (MFI) of the block copolymer is adjusted at 9 g/ 10 min by introduction of hydrogen in both reactors.

The amount of ethylene present in block (B) is 8% by weight and the total amount of ethylene present in the overall block copolymer is 1.6% by weight and the isotacticity of the homopolymer of block (A) is 97%.

The block copolymer is recovered by submitting the slurry extracted from the second reactor to a flashing treatment in the presence of water, followed by a stripping at pH 12 and a final drying.

The block copolymer exhibits the following characteristics
- flexural modulus (Flex Mod) at 23° C. (measured on injection-moulded samples having a 4 mm thickness—ASTM Standard): 1600 MPa;
- melting temperature (Tf) (determined by differential scanning calorimetry): 158° C.
- melting enthalpy (determined by differential scanning calorimetry): 99.6 J/g;
- crystallisation temperature (Tc) (determined by differential scanning calorimetry):115° C.
- notched Izod impact strength, 23°C. (ISO 180/1 A):2.6 $kJ/m^2$
- brilliance (ASTM D-523): 91%
- transparency (DIN ASTM D- 1746):11%

EXAMPLE 2

This example relates to the preparation of a BOPP bottle. In order for the block copolymer to be processed into hollow articles, the following compounds are incorporated into the block copolymer obtained according to example 1:
- 2 g/kg of ethyldibenzylidene sorbitol (nucleating agent);
- 2 g/kg of glycerol monostearate (antistatic agent);
- 1 g/kg of calcium stearate;
- 0.5 g/kg of a phenolic antioxidant (product Irganox® 1010 sold by CIBA-GEIGY);
- 0.6 g/kg of an organic phosphite based-antioxidant (product Irgafos® PEPQ sold by CIBA-GEIGY).

From this polypropylene block copolymer injection moulded preforms were reheated and stretch blow-moulded on a RBU 225 installation (from BEKUM Maschinenfabriken GmbH, Berlin, Germany) to 1 liter biorientated bottles.

| | ELTEX ® P KV 276 | Example 1 |
|---|---|---|
| Top load (N); 23° C. (measured by compression at 25 mm/min) | | |
| 1 mm deformation (N) | 30 | 38 |
| standard deviation (N) | 2 | 2 |
| 2 mm deformation (N) | 60 | 76 |
| standard deviation (N) | 5 | 3 |

A comparison with bi-orientated bottles manufactured in the same conditions from a random ethylene/propylene copolymer (ELTEX® P KV 276 from SOLVAY containing 2.3 weight % ethylene) demonstrates that the BOPP bottles made from the block copolymer of the present invention have a good processability and a very good mechanical properties such as stiffness.

What is claimed is:

1. A propylene block copolymer comprising
   (A) 60–90weight %, based on the total amount of the block copolymer, of a first block of a propylene polymer, optionally containing a small amount of copolymerised ethylene,
   (B) 40–10 weight %, based on the total amount of the block copolymer, of a second block of a ethylene-propylene random copolymer containing 1–10 weight % of ethylene,
   the total ethylene content of the block copolymer being within the range of 0.1–2.5 weight %.

2. The block copolymer as claimed in claim 1, wherein the block (A) is a propylene homopolymer.

3. The block copolymer as claimed in claim 1, wherein the block (A) is a propylene homopolymer with an isotacticity of at least 95% as measured by $^{13}$C NMR spectroscopy.

4. The block copolymer as claimed in claim 1, consisting of
   (A) 75–85 weight %, based on the total amount of the block copolymer, of first block of a polypropylene homopolymer with an isotacticity of 97% as measured by $^{13}$C NMR spectroscopy in mm triades,
   (B) 25–15 weight %, based on the total amount of the block copolymer, of second block of an ethylene-propylene random copolymer containing 4–9 weight % of ethylene,
      the total ethylene content of the block copolymer being within the range of 0.5 –2.0 weight %.

5. The block copolymer as claimed in claim 1, having a melt flow rate (MFI) from 5 to 20 g/10 min.

6. A process for the manufacturing of a block copolymer as claimed in claim 1, comprising a first step wherein propylene is polymerized optionally with a small amount of ethylene in order to form the first block (A) and a second step wherein propylene and ethylene are random copolymerized in order to form the second block (B) in the presence of block (A).

7. A biaxially oriented bottle formed from a block copolymer as claimed in claim 1.

8. A blow molded container, comprising the block copolymer of claim 1.

9. A biaxially oriented bottle formed by the steps comprising:
   (a) injection molding of the block copolymer of claim 1, to form a preform; and
   (b) stretching the preform from about 5 to 10 times at a controlled temperature which is below its melting point.

* * * * *